United States Patent [19]

Shinoda et al.

[11] Patent Number: 5,266,620
[45] Date of Patent: Nov. 30, 1993

[54] RUBBER COMPOSITION

[75] Inventors: Shigeru Shinoda, Chigasaki; Masayoshi Daio; Hideki Ishida, both of Hiratsuka; Tetsuji Kawazura, Kanagawa, all of Japan

[73] Assignee: The Yokohama Rubber Co., Ltd., Tokyo, Japan

[21] Appl. No.: 950,698

[22] Filed: Sep. 25, 1992

[30] Foreign Application Priority Data

Oct. 8, 1991 [JP] Japan .................... 3-260711

[51] Int. Cl.$^5$ .................................................. C08K 3/04
[52] U.S. Cl. .................................. 524/495; 524/496; 524/508
[58] Field of Search .................. 524/495, 496, 508

[56] References Cited

U.S. PATENT DOCUMENTS 4,026,867  5/1977  Gardiner ....................... 523/152
4,364,997  12/1982  Yammamoto et al. ........... 523/156
4,942,192  7/1990  Yasuda et al. .................. 524/436

FOREIGN PATENT DOCUMENTS 60-36962  8/1985  Japan .

Primary Examiner—Paul R. Michl
Assistant Examiner—Edward Cain
Attorney, Agent, or Firm—Finnegan, Henderson, Farabow, Garrett & Dunner

[57] ABSTRACT

A rubber composition for the manufacture of automotive vehicle tires suitably as a bead filler therefor. The composition comprises specified proportions of carbonblack, a modified novolak phenolic resin, hexamethylenetetramine and a polymeric cardanol based on a starting rubber component such that the resulting rubber composition has a relatively low rigidity prior to vulcanization and a relatively high dynamic modulus after vulcanization.

5 Claims, No Drawings

RUBBER COMPOSITION

BACKGROUND OF THE INVENTION

1. Field of the Invention

This invention relates to a rubber composition for use in the manufacture of automotive tires.

2. Prior Art

Generally, tires particularly for their bead fillers have been formed from rubber compositions having a relatively high hardness parameter. There have heretofore been used large quantities of blends such as carbonblack, sulfur, thermosetting resins and the like for the purpose of providing increased dynamic modulus of elasticity (hereinafter referred to as elastic modulus) and hence enhanced hardness of the rubber composition. The use of large amounts of carbonblack is conducive to high hardness rubber compositions, but often results in a rubber composition which is difficult to integrate itself or wrap properly around the roll, not to speak of undue increases in the load on the Banbury mixer used.

Rubber compositions containing large quantities of sulfur are liable to undergo sulfur blooming during extrusion, leading to difficult tire forming operation and reduced product yields.

In an effort to eliminate or alleviate the above difficulties inherent in the use of large quantities of sulfur and carbonblack; that is, to hold their use to a practicable level, it has recently been proposed to use certain thermosetting resins such as novolak type phenol or modified phenol resins. The use of such resins in combination with carbonblack contributes to better processability of the rubber composition thanks to the thermosetting resin softening with the heat generated during the mixing operation, but it still aggravates the tire forming process due to unvulcanized rubber growing too stiff at room temperature, which in turn means a loss of the objectionably plied or bent extrudates.

SUMMARY OF THE INVENTION

With the foregoing problems of the prior art in view, the present invention seeks to provide a high hardness rubber composition suitable for use in the manufacture of automotive vehicle tires.

More specifically, the invention is directed to the provision of a rubber composition which has a relatively low rigidity prior to vulcanization and a relatively high elastic modulus after vulcanization such that the composition is particularly suitable for use as a tire bead filler.

According to the invention, there is provided a rubber composition comprising 100 parts by weight of a rubber component comprised of one or more of the group consisting of naturally occurring rubber, polyisoprene rubber, polybutadiene rubber and styrene-butadiene rubber, 50-70 parts by weight of carbonblack having an average particle size of less than 40 mµ, 5-20 parts by weight of novolak type modified phenol resin, 0.5-2 parts by weight of hexamethylenetetramine, and 5-20 parts by weight of a polymeric cardanol having a viscosity of 20,000-50,000 cps.

DETAILED DESCRIPTION OF THE INVENTION

The invention will be described firstly with respect to respective components of the rubber composition.

(1) Rubber Component

This is selected from the group of naturally occurring rubber (NR), polyisoprene rubber (IR), polybutadiene rubber (BR) and styrene-butadiene rubber (SBR). One or more of these rubber materials may be used.

(2) Carbonblack

This carbonblack is a so-called hard carbon type such as SAF, ISAF, I-ISAF, CF, SCF and HAF. Its average particle size is less than 40 mµ. Those larger in particle size than others may be blended so long as the overall average particle size does not exceed 40 mµ. Greater average particle sizes would fail in achieving the desired elastic modulus. Carbonblack of this description is used in an amount of 50-70 parts by weight per 100 parts by weight of the rubber component. Smaller amounts than 50 weight parts would fail to reach sufficient dynamic modulus of the rubber composition, whilst larger amounts than 70 weight parts would lead to poor rubber processability.

(3) Novolak type Modified Phenol Resin

Specific examples of this resin include novolak phenolic resins modified with an oil such as rosin oil, tall oil, cashew oil, linolic acid, oleic acid and linolenic acid, those modified with an aromatic hydrocarbon such as xylene and mesitylene and those modified with rubber such as nitrile rubber. The amount of these resins to be blended is in the range of 5-20 parts by weight per 100 parts by weight of the rubber component. Less than 5 weight parts would result in reduced dynamic modulus, whilst more than 20 weight parts would lead to difficult mixing.

(4) Hexamethylenetetramine

This may be any commercially available product and is added in an amount of 0.5-2 parts by weight per 100 parts by weight of the rubber component, or preferably in a ratio of 1:10 with respect to the above novolak resin.

(5) Polymeric Cardanol

This is well known and is derived from the thermal polymerization of cashew nut liquid or cashew oil in a manner shown in the following formula:

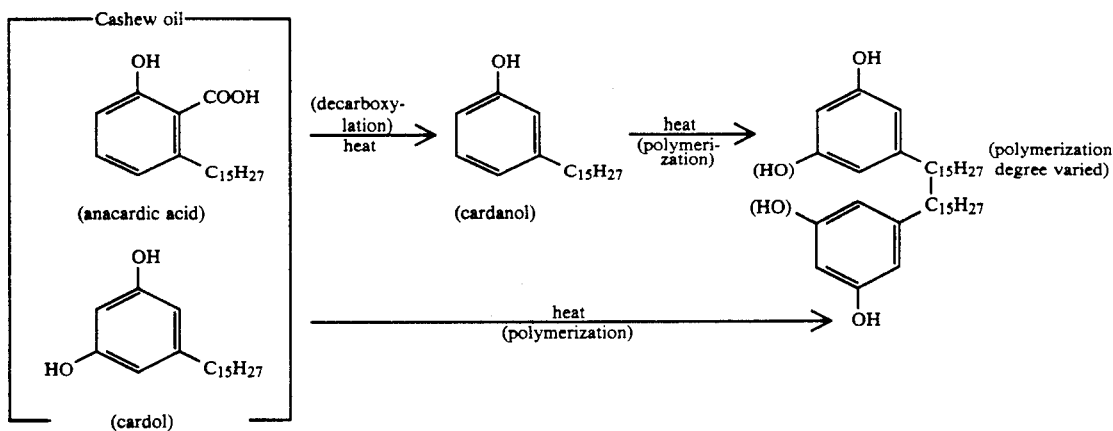

Polymeric cardanol has a viscosity in the range of 20,000–50,000 cps. Lower viscosities than 20,000 cps would fail to provide the desired elastic modulus of the rubber composition after vulcanization, whilst higher viscosities than 50,000 cps would lead to too viscous rubber compositions prior to vulcanization. Cardanol used in the invention is blended in an amount of 5–20 parts by weight per 100 parts by weight of the rubber component. Smaller amounts than 5 weight parts would reduce the softening effect at unvulcanized stage, whilst larger than 20 weight parts would invite bleeding before vulcanization.

(6) Other Additives

There may be, if desired, used some vulcanization agent or accelerator, or other suitable additives provided that they are not detrimental to the performance of the inventive composition.

The invention will be further described by way of the following examples.

EXAMPLE

Rubber sheets were produced with the use of various rubber compositions as controls for comparison with the inventive composition as shown in Table 1.

Mixing of the components was carried out by B-type Banbury mixer (1.7 liter capacity) in a manner well known in the art. The resulting rubber compositions were press-vulcanized at 160° C. for 15 minutes and formed into 2 mm thick rubber sheets. Sample sheets measuring 20 mm long and 5 mm wide were tested for their respective dynamic modulus by a viscoelastic spectrometer at room temperature under a set of conditions; i.e. 5% initial strain elongation, a frequency of 20 Hz and a 2% dynamic strain. Rigidity of unvulcanized rubber compositions was determined in terms of Mooney viscosity $ML_{1+4}$ (100° C.) measured in accordance with JIS procedures. Unvulcanized rigidity is greater the higher the Mooney viscosity. Surface bleeding was visually checked of unvulcanized rubber compositions two days after formation into sheets. The results of these tests are shown in Table 1, from which it is evident that the inventive rubber composition excels all the controls in respect of Mooney viscosity, JIS hardness and dynamic modulus, meaning that the inventive composition has lower rigidity prior to vulcanization and higher elastic modulus after vulcanization.

TABLE 1

|  | Comparative Rubber Compositions | | | | Inventive Rubber Composition | Comparative Rubber Composition |
| --- | --- | --- | --- | --- | --- | --- |
|  | 1 | 2 | 3 | 4 | 1 | 5 |
| NR | 70 | 70 | 70 | 70 | 70 | 70 |
| SBR | 30 | 30 | 30 | 30 | 30 | 30 |
| zinc oxide | 10.00 | 10.00 | 10.00 | 10.00 | 10.00 | 10.00 |
| stearic acid | 2.00 | 2.00 | 2.00 | 2.00 | 2.00 | 2.00 |
| cashew modified cresol resin *1) | 10.00 | 10.00 | 10.00 | 10.00 | 10.00 | 10.00 |
| HAF carbonblack (particle size 26~30 mµ) | 60 | 60 | 60 | 60 | 60 | 60 |
| cashew oil |  | 15 |  |  |  |  |
| cardanol (viscosity 56 cps) |  |  | 15 |  |  |  |
| polymeric cardanol (viscosity 4000 cps) |  |  |  | 15 |  |  |
| polymeric cardanol (viscosity 37000 cps) |  |  |  |  | 15 | 25 |
| sulfur | 5.5 | 5.5 | 5.5 | 5.5 | 5.5 | 5.5 |
| accelerator *2) | 3.5 | 3.5 | 3.5 | 3.5 | 3.5 | 3.5 |
| hexamethylenetetramine | 1.20 | 1.20 | 1.20 | 1.20 | 1.20 | 1.20 |
| Mooney viscosity $ML_{1+4}$ (100° C.) | 85.4 | 52.0 | 55.2 | 63.2 | 69.2 | 64.3 |
| JIS hardness (25° C.) (JISA) | 92 | 93 | 93 | 94 | 96 | 96 |
| dynamic modulus (20° C., MPa) | 59.2 | 55.3 | 40.5 | 51.9 | 84.8 | 88.4 |

TABLE 1-continued

| | Comparative Rubber Compositions | | | | Inventive Rubber Composition | Comparative Rubber Composition |
|---|---|---|---|---|---|---|
| | 1 | 2 | 3 | 4 | 1 | 5 |
| surface bleed | no | no | no | no | no | yes |

Note:
*1) Novolak resin comprised of 70 wt % of cresol and 30 wt % of cashew oil
*2) N-oxydiethylene-2-benzothiazolsulfenamide

What is claimed is:

1. A rubber composition comprising 100 parts by weight of a rubber component selected from the group consisting of naturally occurring rubber, polyisoprene rubber, polybutadiene rubber and styrene-butadiene rubber, from 50 to 70 parts by weight of carbonblack having an average particle size of less than 40 m$\mu$, from 5 to 20 parts by weight of a modified novolak type phenol resin, from 0.5 to 2 parts by weight of hexamethylenetetramine, and from 5 to 20 parts by weight of polymeric cardanol having a viscosity of from 20,000 to 50,000 cps.

2. The rubber composition of claim 1, wherein said modified novolak type phenol resin is a novolak phenolic resin modified with an oil, an aromatic hydrocarbon or a rubber.

3. The rubber composition of claim 2, wherein said novolak phenolic resin is modified with resin oil, tall oil, cashew oil, linolic acid, oleic acid, linolenic acid, xylene, mesitylene, or nitrile rubber.

4. The rubber composition of claim 3, wherein said novolak phenolic resin is a cresol resin modified with cashew oil.

5. The rubber composition of claim 1, further comprising a vulcanization agent or an accelerator.

* * * * *